(12) United States Patent
Lorenz

(10) Patent No.: US 6,557,495 B2
(45) Date of Patent: May 6, 2003

(54) LASER PET TOY

(76) Inventor: Eileen Lisa Lorenz, 2024 N. 55 St., Milwaukee, WI (US) 53208

( * ) Notice: Subject to any disclaimer, the term of this patent is extended or adjusted under 35 U.S.C. 154(b) by 17 days.

(21) Appl. No.: 09/898,814

(22) Filed: Jul. 5, 2001

(65) Prior Publication Data

US 2002/0002955 A1 Jan. 10, 2002

Related U.S. Application Data

(60) Provisional application No. 60/216,087, filed on Jul. 6, 2000.

(51) Int. Cl.[7] ............................................. A01K 15/02
(52) U.S. Cl. ........................................ 119/707; 362/259
(58) Field of Search ................................ 119/707, 708, 119/702; 362/259

(56) References Cited

U.S. PATENT DOCUMENTS

| | | | | |
|---|---|---|---|---|
| 4,160,285 A | | 7/1979 | Shibla | |
| 4,386,848 A | * | 6/1983 | Clendenin et al. | 356/5 |
| 4,761,715 A | * | 8/1988 | Brooks | 362/23 |
| 5,139,907 A | * | 8/1992 | Simpson et al. | 430/58 |
| 5,368,392 A | * | 11/1994 | Hollander et al. | 374/121 |
| 5,443,036 A | * | 8/1995 | Amiss et al. | 119/707 |
| 5,934,223 A | * | 8/1999 | Ellery-Guy | 119/702 |
| 6,016,771 A | * | 1/2000 | Baiera et al. | 119/708 |
| 6,113,458 A | * | 9/2000 | Brown | 446/438 |
| 6,170,968 B1 | | 1/2001 | Caswell | |
| 6,215,269 B1 | * | 4/2001 | Gregg et al. | 318/640 |

* cited by examiner

Primary Examiner—Charles T. Jordan
Assistant Examiner—Susan C. Alimenti

(57) ABSTRACT

An improved laser pet toy that entertains pets, especially cats. The pet toy comprises a housing containing a laser source which projects a laser beam into a mirror. In turn, the mirror forecasts the beam through a transparent window set in the housing and projects the beam onto an opaque surface. The random movement of the beam is provided by the motion of the pivoting mirrors which is driven by a motor and a plurality of arm members.

19 Claims, 4 Drawing Sheets

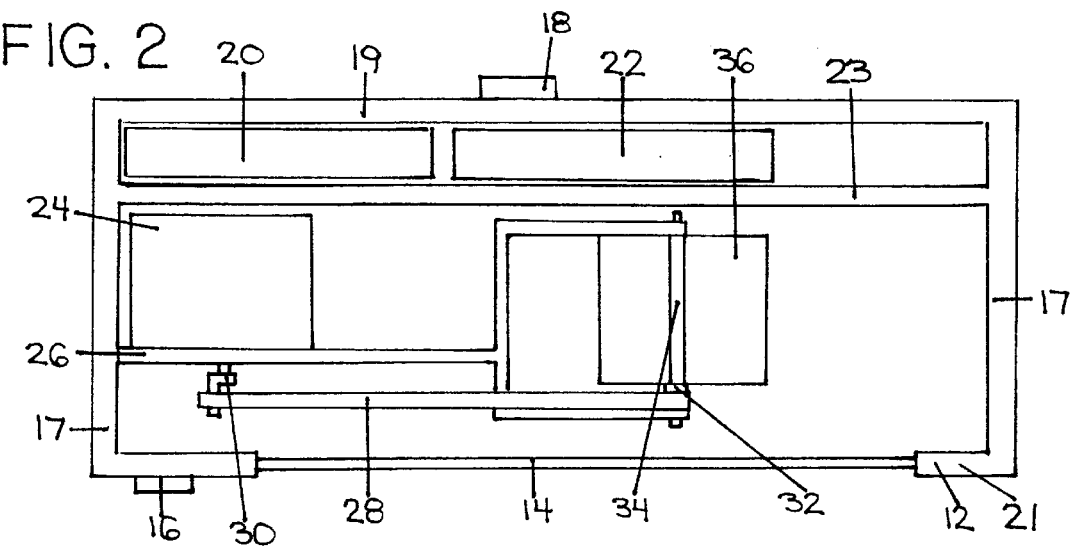
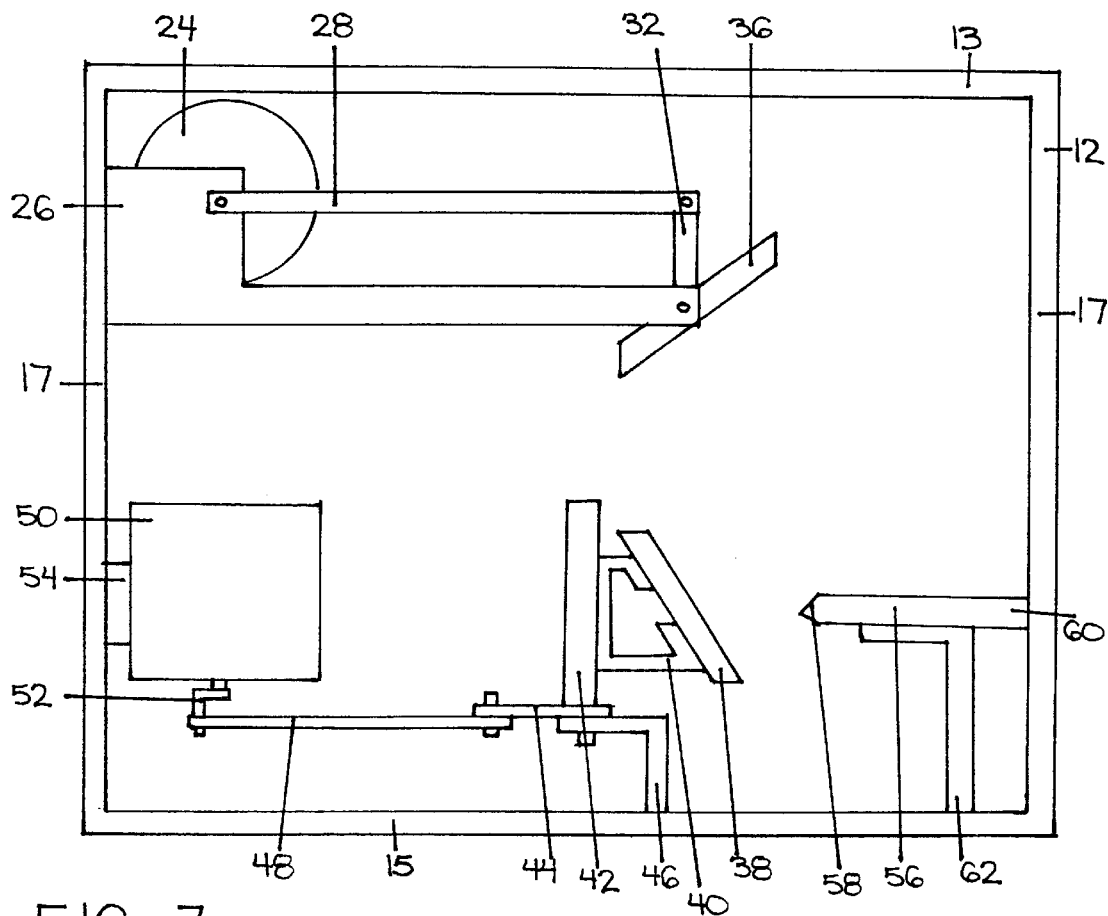

LASER PET TOY

CROSS-REFERENCES TO OTHER APPLICATIONS

Provisional application Ser. No. 60/216,087, filed Jul. 6, 2000.

BACKGROUND OF THE INVENTION

1. Field of Invention

The present invention relates generally to an improved laser pet toy for the exercise and amusement of a pet.

2. Description of the Prior Art

Many pet toys involve motion because it is a known fact that pets, particularly cats, are attracted to moving objects. It is also a known fact that cats are attracted to LASER (light amplification by stimulated emission of radiation) beams. Unfortunately, to operate most pet toys, the owner must use repetitive motions over long periods of time to keep the interest of the cat. These repeated movements over an extended time can cause soreness, strain and even pain for the owner's fingers, wrists, elbow and hand. Prior art of this type is described in U.S. Pat. No. 5,443,036.

To operate the laser pet toy disclosed in U.S. Pat. No. 5,443,036 the owner must continuously press the trigger switch with his/her fingers while, at the same time, move his/her hand, wrist and elbow in a repeated motion so that the cat will chase the laser beam around the room. Since such movement is strenuous and hurtful to the owner's ligaments, the cat's activity is usually stopped long before the cat wants the activity to end. This results in an unused toy.

Other patent disclosures do address the issue of providing continuous motion without straining the owner's ligaments rather effectively, but these devices require the cat to play with the actual toy itself which becomes a safety issue to both pet and owner. Given that a cat's natural predatory instinct includes pouncing and jumping on its prey until its prey is lifeless, the toy is usually broken. These small broken pieces may easily cause a choking hazard to the pet. Prior art of this type is illustrated in U.S. Pat. No. 6,016,771 and U.S. Pat. No. 5,934,223. In U.S. Pat. No. 5,934,223, the cat should only be playing with the light image being projected from the pet toy, but since the cat will also be seeing the moving members of the device and since the toy is positioned on the floor or hanging from a door knob, it will be within the cat's reach to pounce and jump on the toy itself. This will result in a broken toy. Another safety concern arises when the device is left stationed on the floor causing the owner to trip and fall over it.

U.S. Pat. No. 5,934,223 does address the issue of providing continuous motion without causing strain to the owner's ligaments, however, the device is designed to project an image primarily onto the ceiling and walls rather than the floor which does not take into consideration the natural instincts of a cat. A cat's natural instinct is to ensue chase until it catches its prey which, in this disclosure, is a beam of light. In order for the cat to capture the beam of light, the pet will climb the drapes, the walls and the furniture. While this may provide exercise and amusement to the cat, the owner will be frustrated and unhappy. This will result in an unused toy.

Another limitation to U.S. Pat. No. 5,934,223 is its high cost to manufacture with regard to its materials, especially the computer chip or integrated circuit. The programmed computer chip determines the randomness of the light source thereby making it an essential member of the device. Consumers will not pay high prices for pet toys, therefore, a need does exist for a stand alone laser pet toy that is economical to produce thereby making it economically available to consumers.

Yet another limitation to U.S. Pat. No. 5,934,223 is that the only pattern it provides is a circular motion, whether it be on the ceiling, wall or floor. A toy must be able to provide both a linear and a circular pattern of randomness in varying directions in order to keep a pet entertained for long periods of time.

Each of these disclosures is subject to the limitations discussed above, thereby making none of the prior art pet toys entirely satisfactory. Thus, there exists a need for an improved laser pet toy that overcomes, in combination, all of the limitations heretoforementioned above. Accordingly, a need exists for an improved laser pet toy that entertains pets, especially cats, without causing soreness and strain to the owner's ligaments. There is a further need for a stand alone pet toy which appears self-animated and does not require the device to be within the pet's reach thereby addressing safety concerns. And yet a further need exists for a low cost laser pet toy that provides both a circular and linear randomness motion in a range that is beneficial to a cat's natural predatory instinct as well as environmentally suitable to the pet owner.

BRIEF SUMMARY OF THE INVENTION

The general purpose of the present invention is to provide an improved laser pet toy which has all the advantages of the prior art and none of the disadvantages.

In the preferred embodiment, the housing unit has a transparent window situated in the front wall. Within the housing unit is a laser source which reflects a laser beam into the first of two mirrors. The mirrors are positioned in such a way that the reflection from the first mirror forecasts the beam into the second mirror with the second mirror then projecting its reflection through the window thus making the beam appear on the floor. The circular and linear randomness of the pattern is provided by a series of arms with each series independently pivoting a different mirror.

There has thus been outlined, rather broadly, the more important features of the preferred embodiment in order that the detailed description thereof that follows may be better understood.

It is therefore an object of the present invention to provide an improved laser pet toy which has all the advantages of the prior art pet devices and none of the disadvantages.

It is a primary object of the invention to provide a new and improved laser pet device to exercise and entertain pets, in particular, cats.

It is another object of the invention to provide a stand alone laser pet toy designed to keep the interest of the pet without causing soreness and strain to the owner's ligaments.

It is another object of the invention to provide a stand alone pet toy which can maintain its position out-of reach of the pet while the device is engaging the pet in exercise activity thus creating a safer environment for the pet and its owner.

It is another object of the invention to provide a stand alone pet toy that exhibits a random range of motion that satisfies both the predatory instincts of the pet as well as taking into consideration the pet owner's needs.

It is another object of the invention to provide a laser pet toy that can exhibit a random range of motion yet still be manufactured at a low cost thereby making the device economically available to consumers.

It is another object of the invention to provide a stand alone pet toy that exhibits a random range of movement which includes both circular and linear motion.

It is another object of the invention to provide an improved pet toy comprising a housing comprising a laser source which projects a laser beam into a mirror. In turn, the mirror forecasts the beam through a transparent window set in the housing and projects the beam onto an opaque surface. The random movement of the beam is provided by the motion of the mirror which is driven by a motor and a plurality of members.

For the purpose of clarifying the nature of the present invention, one exemplary embodiment of the invention is illustrated in the hereinbelowdescribed figures of the accompanying drawings and is described in detail hereinafter. It is to be taken as representative of the multiple embodiments of the invention which lie within the scope of the invention.

BRIEF DESCRIPTION OF DRAWINGS

FIG. 2 is a top view of a preferred embodiment of the present invention.

FIG. 3 is a side view of a preferred embodiment of the present invention.

DETAILED DESCRIPTION OF INVENTION

Figure 1:
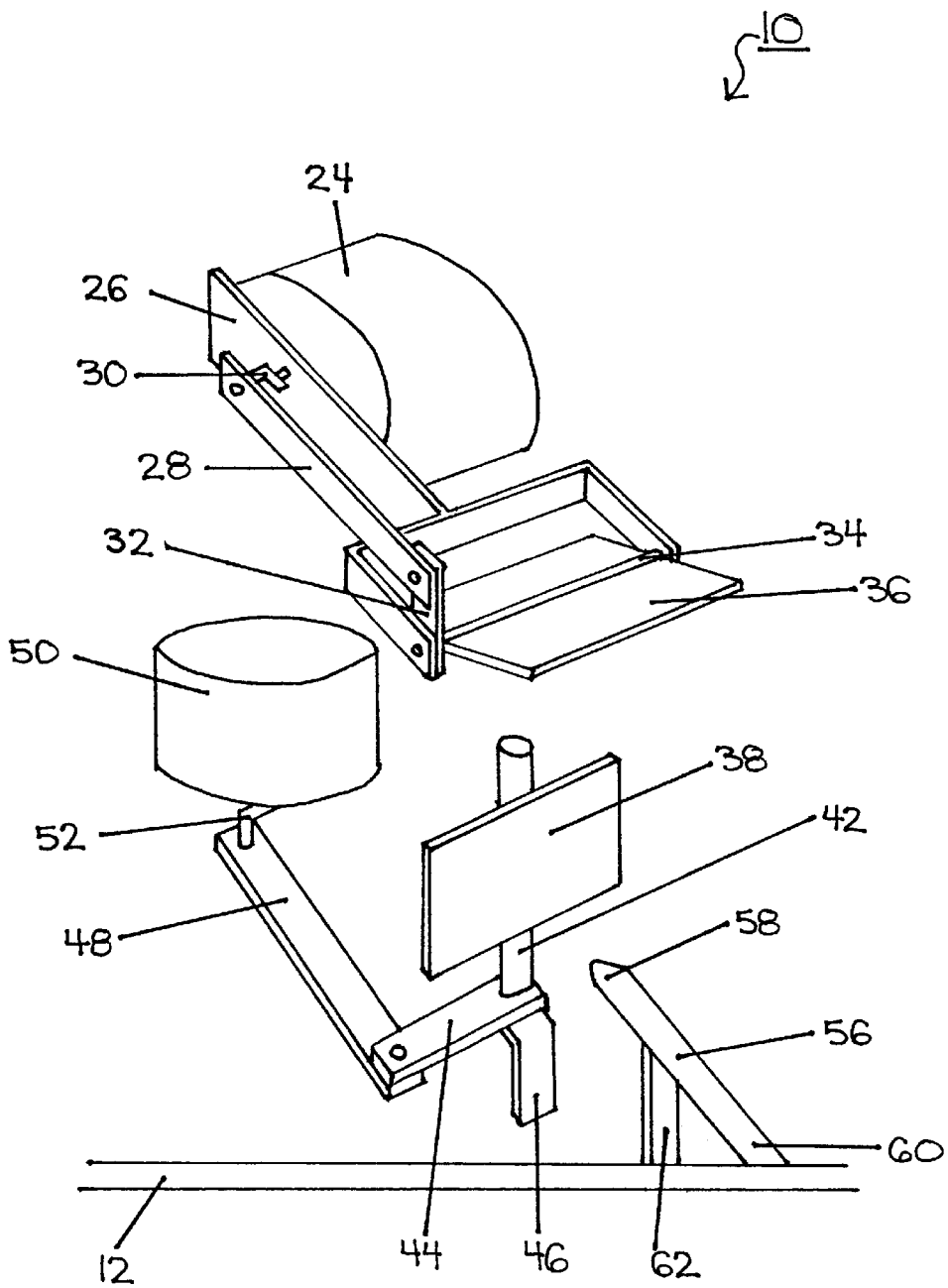
FIG. 1 is a perspective view of a preferred embodiment of the present invention.

FIGS. 1–3 show a preferred embodiment of a pet toy 10. In its broadest context, the pet toy 10 comprises a housing 12 which includes a horizontal planar top 13 and a horizontal planar bottom 15 which allows said bottom 15 to be resting directly on a flat surface and would allow said pet toy 10 to remain stationary until its owner physically moves it. Said housing 12 also consists of a rear wall 19, a pair of side walls 17 and a front wall 21. A transparent window 14 is inset in said front wall. An inside wall 23 could also be added parallel to said front wall to conceal a control box 22 and a speed control box 20. A hook 18 may be attached on back wall of the housing 12 so pet toy 10 can be hung. Within the housing 12 is a motor 24, which is energized by suitable means, such as an electric cord or battery operated, neither of which is shown, through said control box 22. A motor bracket 26 is secured to the housing 12 by screws, however, gluing or other fasteners could also be used. A motor 24 is connected to the motor bracket 26 by screws, however, gluing or other fasteners could also be used. The motor 24 is connected to the first end of arm 28 by a crank arm 30. The second end of arm 28 is connected about perpendicular to first end of arm 32 by a pin or any other type of fastener. The second end of arm 32 is connected about perpendicular to the first end of shaft 34 by gluing or any other type of fastener. In addition, the first end of shaft 34 is also connected to a bracket 26 by means of a pin or any other type of fastener. The second end of shaft 34 is connected to bracket 26 by means of a pin or any other type of fastener.

A mirror 36 is fastened lengthwise to shaft 34 by gluing or any other type of fastener.

A mirror 38 is positioned directly below mirror 36 such that mirror 38 is mounted at an angle to a bracket 40 so that the reflection seen in mirror 38 reflects into mirror 36. A bracket 40 is mounted lengthwise to shaft 42 by gluing or any other type of fastener. The lower end of shaft 42 is connected about perpendicular to the first end of arm 44 by glue or any other type of fastener. In addition, the lower end of shaft 42 is also connected to the first end of bracket 46 by means of a pin or any other type of fastener. The second end of bracket 46 is secured to the housing 12 by gluing or any other type of fastener. The second end of arm 44 is connected to the first end of arm 48 by a pin or any other type of fastener. The second end of arm 48 is connected to a motor 50 by a crank arm 52. The motor 50 is secured to the housing 12 by a motor bracket 54. The speed of the motors 24 and 50 may be adjusted by control knob 16 which is attached to housing 12 and is operated through speed control box 20.

A laser source 56, preferably Class IIIA with a maximum output of 5 mW, is energized by suitable means, such as an electric cord or battery operated, neither of which is shown, through said control box 22, is mounted on the first end of bracket 62 by screws, however, gluing or other fasteners could also be used. The second end of bracket 62 is secured to the housing 12 by screws, however, gluing or other fasteners could also be used. The laser source 56 is comprised of a laser emitting end 58 and a power receiving end 60 which emits a laser beam when activated.

The laser emitting end 58 must be positioned so that the laser beam reflects into mirror 38. Thus, mirror 38 must be positioned at an angle so that the reflection seen in mirror 38 reflects into mirror 36. The mirror 36 must be positioned at an angle so that the reflection in mirror 36 reflects through the transparent window 14 onto the floor.

In use, the operator places the pet toy 10 on the edge of a shelf, plugs the toy into a standard electrical outlet, not shown, and adjusts a control knob 16, as desired, to regulate the speed of the motors 24 and 50. The motor 24 will turn the crank arm 30 which will interengage arms 28, 32, and shaft 34 to turn simultaneously and will move the mirror 36 at the desired speed. The motor 50 will turn the crank arm 52 which will cause arms 44, 48, and shaft 42 to turn simultaneously and will move the mirror 38 at the desired speed. Thus, the light from the laser source 56 will reflect into mirror 38 which in turn will reflect into mirror 36. The reflection from mirror 36 will forecast through the transparent window 14 projecting a moving laser beam onto the floor. Since the beam is invisible until it intersects the floor, the pet will only see and only be chasing one red circle. The variable speed of the pet toy 10 is also extremely attractive to cats because each cat's agility is different thereby providing a device that will satisfy a wide range of users.

It is a preferred method for the pet toy 10 to have two variable speed motors thereby providing each mirror with two different speeds of motion. These two different speeds will, in turn, provide a greater pattern of randomness which will make the pet toy 10 even more attractive to cats. As the pet toy 10 increases the number of variable speed motors and mirrors used, so increases the randomness of the pattern. To even further increase the randomness of the pattern, the RPM of the motor that scans the beam parallel to the window is always lower than the RPM of the motor that scans the beam in the perpendicular direction. In other words, with regards to FIG. 1, the top motor would have a lower RPM than the bottom motor.

There are several preferred methods for said mirrors. Even though any type of mirror could be used, first surface mirrors are preferred because they eliminate the possibility of multiple ghost images when said laser beam is reflected onto a floor. Secondly, the preferred placement of said mirrors is when said laser beam is swept through a 60° angle in a direction parallel to the horizontal and 38° in the perpendicular direction. Thirdly, laser beams are often scanned by bouncing a laser beam from a rotating multifaceted mirror. This method is not acceptable for the toy, because after the beam has completed one scan, it immediately returns to its starting point and begins a new scan. Having the laser beam jump instantly from one location to another would just confuse the pet. It is to be understood that having a pet toy comprised of a number of motors and mirrors that are less than what is discussed hereinabove does not diminish from the scope of the invention. Since a cat's agility decreases as its age increases, a pet toy which provides a minimum degree of randomness would be of interest to elderly or handicapped cats who, despite their diminished abilities, still need their exercise to maintain their health, but cannot sustain the high level of excitement and activity that the preferred embodiment provides. Therefore, FIGS. 4–7 show alternative embodiments that provide varying degrees of randomness without departing from the spirit and scope of the present invention.

Figure 4:
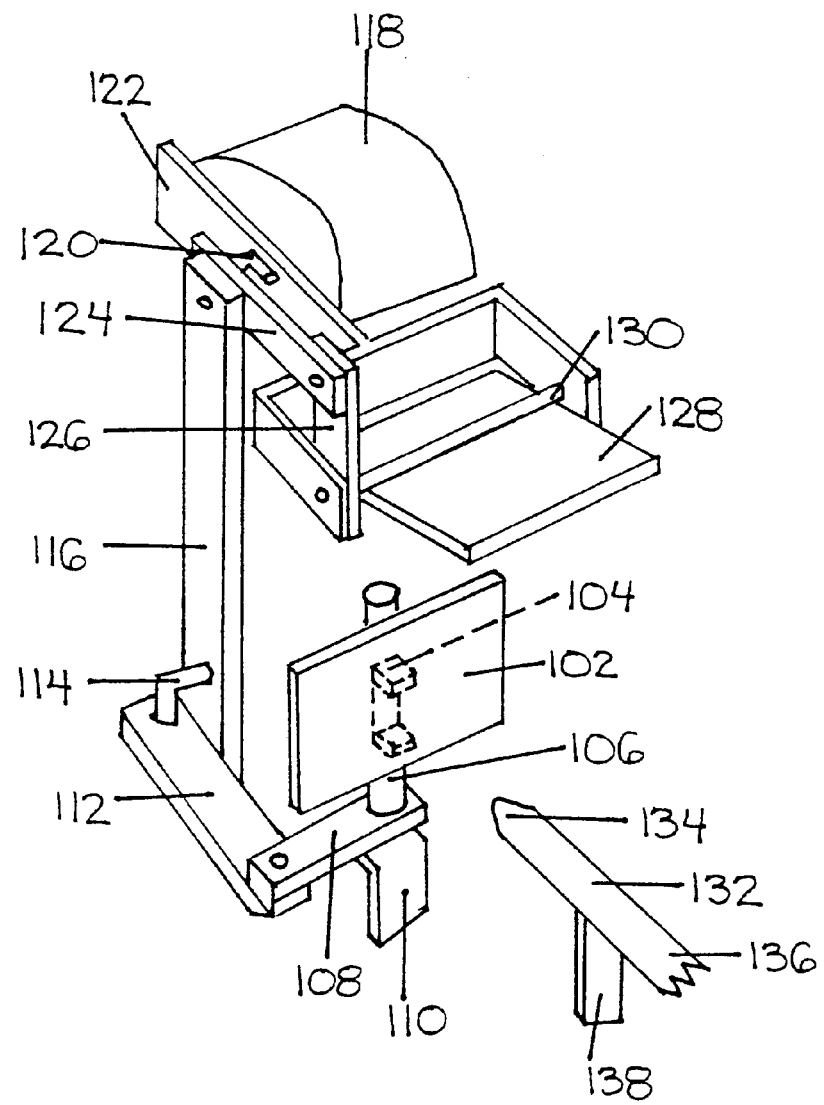
FIG. 4 is a perspective view of a second embodiment of the present invention.

In a second embodiment, as shown in FIG. 4, a mirror 102 is mounted at an angle to a bracket 104 by gluing or any other type of fastener. The bracket 104 is mounted lengthwise to a shaft 106 by gluing or any other type of fastener. The lower end of shaft 106 is connected about perpendicular to the first end of arm 108 by glue or any other type of fastener. In addition, the lower end of shaft 106 is also connected to a bracket 110 by means of a pin or any other type of fastener. The second end of arm 108 is connected to the first end of arm 112 by a pin or any other type of fastener. The second end of arm 112 is connected to the first end of arm 116 by a crank arm 114. The second end of arm 116 is connected to a motor 118 by a crank arm 120. The motor 118 is connected to a motor bracket 122 by screws, however, gluing or other fasteners could also be used. A crank arm 120 connects the motor 118 to the first end of arm 124. The second end of arm 124 is connected about perpendicular to first end of arm 126 by a pin or any other type of fastener. The second end of arm 126 is connected about perpendicular to the first end of shaft 130 by gluing or any other type of fastener. In addition, the first end of shaft 130 is also connected to the bracket 122 by means of a pin or any other type of fastener. The second end of shaft 130 is connected to the bracket 122 by means of a pin or any other type of fastener. A mirror 128 is fastened lengthwise to the shaft 130 by gluing or any other type of fastener.

A laser source 132 is mounted on a bracket 138 by screws, however, gluing or other fasteners could also be used. The laser source 132 is comprised of a laser emitting end 134 and a power receiving end 136 which emits a laser beam when activated. The laser emitting end 134 must be positioned so that the laser beam reflects into mirror 102. Thus, mirror 102 must be positioned so that the reflection seen in mirror 102 reflects into mirror 128.

In this embodiment, another method to increasing the randomness, with using only one motor and without varying the motor speeds, is by having different lengths for the first set of arms (108,112) than for the second set of arms (124,126) thus causing the two mirrors to pivot at different speeds.

As to the operation of the second embodiment and all other embodiments hereinbelowdescribed, the same should be apparent from the above description. Accordingly, no further discussion relating to the manner of operation will be provided.

Figure 5:
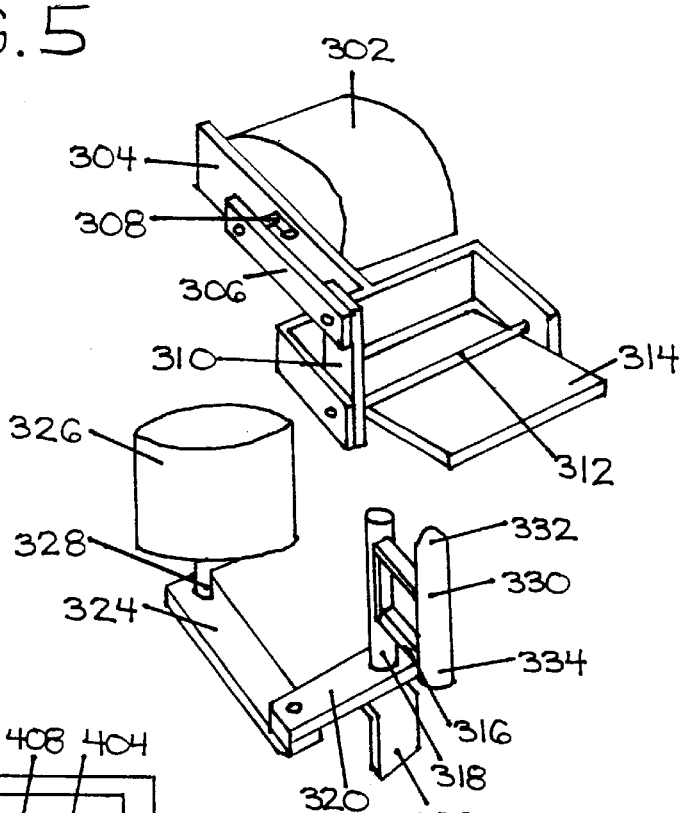
FIG. 5 is a perspective view of a third embodiment of the present invention.

In a third embodiment, as shown in FIG. 5, a motor 302 is connected to the first end of arm 306 by a crank arm 308. The second end of arm 306 is connected about perpendicular to the first end of arm 310 by a pin or any other type of fastener. The second end of arm 310 is connected about perpendicular to the first end of a shaft 312 by gluing or any other type of fastener. In addition, the first end of shaft 312 is also connected to a bracket 304 by means of a pin or any other type of fastener. The second end of shaft 312 is connected to a bracket 304 by means of a pin or any other type of fastener. A mirror 314 is fastened lengthwise to the shaft 312 by gluing or any other type of fastener.

A laser source 330 is mounted to a bracket 316 by gluing or any other type of fastener. The laser source 330 is comprised of a laser emitting end 332 and a power receiving end 334 which emits a laser beam when activated. The laser emitting end 332 must be positioned so that the laser beam reflects into mirror 314. The bracket 316 is mounted lengthwise to a shaft 318 by gluing or any other type of fastener. The lower end of shaft 318 is connected about perpendicular to the first end of arm 320 by glue or any other type of fastener. In addition, the lower end of shaft 318 is also connected to a bracket 322 by means of a pin or any other type of fastener. The second end of arm 320 is connected to the first end of arm 324 by a pin or any other type of fastener. The second end of arm 324 is connected to a motor 326 by a crank arm 328.

Figure 6:
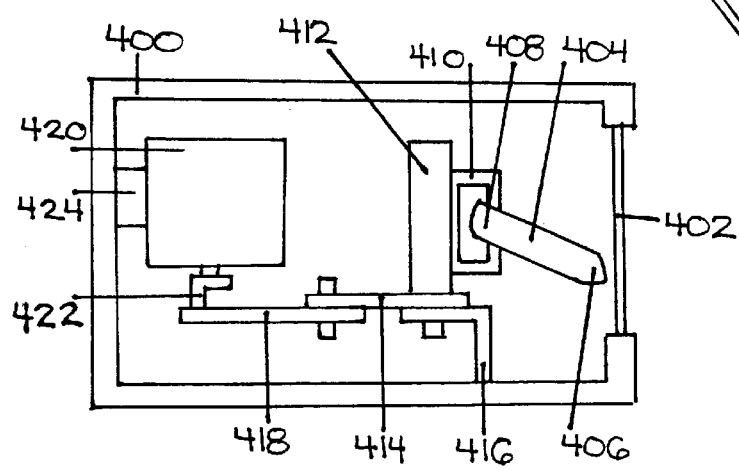
FIG. 6 is a side view of a fourth embodiment of the present invention.
Figure 7:
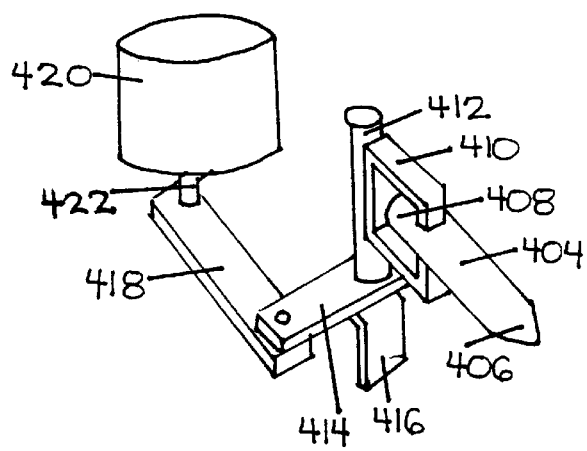
FIG. 7 is a perspective view of a fourth embodiment of the present invention.

The fourth embodiment, as shown in FIGS. 6–7, is different from the hereinabovedescribed embodiments such that the device does not contain mirrors. The laser source 404 moves by the same plurality of means as the heretoforementioned embodiments except the beam reflects directly through the transparent window 402 onto the floor. The fourth embodiment would be extremely attractive to elderly cats who still need exercise, but cannot sustain the high level of excitement and activity of the preferred embodiment.

As shown in FIGS. 6–7, laser source 404 is mounted on the first end of bracket 410 by gluing or any other type of fastener. The bracket 410 is mounted lengthwise to a shaft 412 by gluing or any other type of fastener. The lower end of shaft 412 is connected about perpendicular to the first end of arm 414 by glue or any other type of fastener. In addition, the lower end of shaft 412 is also connected to the first end of bracket 416 by means of a pin or any other type of fastener. The second end of bracket 416 is secured to the housing 400 by gluing or any other type of fastener. The second end of arm 414 is connected to the first end of arm 418 by a pin or any other type of fastener. The second end of arm 418 is connected to a motor 420 by a crank arm 422. The motor 420 is secured to housing 400 by a motor bracket 424.

The laser source 404 is comprised of a laser emitting end 406 and a power receiving end 408 which emits a laser beam when activated. The laser emitting end 406 must be positioned so that the laser beam reflects through the transparent window 402 onto the floor.

While the present invention has been described in accordance with a preferred and modified embodiments thereof, it is believed that those familiar with the art will recognize the advancement of the present invention over the prior art and will understand that numerous modifications can be made without departing from the spirit and scope of the present invention.

I claim:

1. A pet toy comprising of:
   a rectangular housing including a horizontal planar top and a horizontal planar bottom which allows said bottom to be resting directly on a flat surface, therebetween consisting of a rear wall, a pair of side walls, and a front wall with a transparent window inset in said front wall, thereby defining an enclosed interior;
   a laser source mounted within said housing and parallel to said window;
   a first motor;
   a second motor;
   a first mirror mounted within said housing with reflective surface facing laser emitting end of said laser source;
   a second mirror mounted within said housing with reflective surface facing reflective surface of said first mirror;
   a means for providing movement from said first motor to said first mirror;
   said first mirror rigidly mounted to a bracket with said bracket rigidly attached to a shaft;
   said shaft substantially vertical with first end pivotably connected to a support;
   a first arm rigidly mounted and positioned perpendicular to said shaft;
   said first arm pivotably connected and positioned parallel to a second arm;
   said second arm is rotatably connected to said first motor;
   a means for providing movement from said second motor to said second mirror; and a control means coupled to said first motor, said second motor, said laser source and a current source.

2. A pet toy as set forth in claim 1 wherein said means to provide movement from said second motor to said second mirror, comprising:
   said second mirror rigidly mounted to a rod;
   a third arm rigidly mounted and positioned perpendicular to said rod;
   said third arm pivotably connected and positioned perpendicular to a fourth arm;
   said fourth arm is rotatably connected to said second motor.

3. A pet toy as set forth in claim 1 and further comprising:
   a speed control means for regulating the speed of said first motor and said second motor.

4. A pet toy as set forth in claim 3 and further comprising:
   a manual switch attached to exterior of said housing for adjusting said speed control means.

5. A pet toy as set forth in claim 1 and further comprising:
   a hook shaped attachment member that is attached to exterior of said back wall.

6. A pet toy comprising of:
   a rectangular housing including a horizontal planar top, and a horizontal planar bottom which allows said bottom to be resting directly on a flat surface, therebetween consisting of a rear wall, a pair of side walls, and a front wall with a transparent window inset in said front wall, thereby defining an enclosed interior;
   a laser source mounted within said housing and parallel to said window;
   a motor;
   a first mirror mounted within said housing with reflective surface facing laser emitting end of said laser source;
   a second mirror mounted within said housing with reflective surface facing reflective surface of said first mirror;
   a means for providing movement from said motor to said first mirror;
   a rod pivotably connected to a bracket;
   said first mirror rigidly mounted to said rod;
   a first arm rigidly mounted and positioned perpendicular to said rod;
   said first arm pivotably connected and positioned perpendicular to a second arm;
   said second arm is rotatably connected to said motor;
   a means for providing movement from said motor to said second mirror; and
   a control means coupled to said motor, said laser source and a current source.

7. A pet toy as set forth in claim 6 wherein said means for providing movement from said motor to said second mirror, comprising:
   said second mirror rigidly mounted to a bracket with said bracket rigidly attached to a shaft;
   said shaft substantially vertical with first end pivotably connected to a support;
   a third arm rigidly mounted and positioned perpendicular to said shaft;
   said third arm pivotably connected and positioned parallel to a fourth arm;
   said fourth arm is rotatably connected to and positioned perpendicular to an elongated fifth arm;
   said fifth arm is pivotably connected to end of said second arm wherein said second arm is already connected to said motor coupling the same rotating element.

8. A pet toy as set forth in claim 6 and further comprising:
   a speed control means for regulating the speed of said motor.

9. A pet toy as set forth in claim 8 and further comprising;
   a manual switch attached to exterior of said housing for adjusting said speed control means.

10. A pet toy as set forth in claim 6 and further comprising:
    a hook shaped attachment member that is attached to exterior of said back wall.

11. A pet toy comprising of:
    a rectangular housing including a horizontal planar top and a horizontal planar bottom which allows said bottom to be resting directly on a flat surface, therebetween consisting of a rear wall, a pair of side walls, and a front wall with a transparent window inset in said front wall, thereby defining an enclosed interior;
    a laser source vertically mounted within said housing;
    a first motor;
    a second motor;
    a mirror mounted within said housing with reflective surface facing laser emitting end of said laser source;
    a means for providing movement from said first motor to said laser source;
    said laser source rigidly mounted to a bracket with said bracket rigidly attached to a shaft;
    said shaft substantially vertical with first end pivotably connected to a support;
    a first arm rigidly mounted and positioned perpendicular to said shaft;
    said first arm pivotably connected and positioned parallel to a second arm;
    said second arm is rotatably connected to said first motor;

a means for providing movement from said second motor to said mirror;

a control means coupled to said first motor, said second motor, said laser source and a current source.

12. A pet toy as set forth in claim 11 wherein said means for providing movement from said second motor to said mirror, comprising:

said mirror rigidly mounted to a rod;

a third arm rigidly mounted and positioned perpendicular to said rod;

said third arm pivotably connected and positioned perpendicular to a fourth arm;

said fourth arm is rotatably connected to said second motor.

13. A pet toy as set forth in claim 11 and further comprising:

a speed control means for regulating the speed of said first motor and said second motor.

14. A pet toy as set forth in claim 13 and further comprising:

a manual switch attached to exterior of said housing for adjusting said speed control means.

15. A pet toy as set forth in claim 11 and further comprising:

a hook shaped attachment member that is attached to exterior of said back wall.

16. A pet toy comprising of:

a rectangular housing including a horizontal planar top and a horizontal planar bottom which allows said bottom to be resting directly on a flat surface, therebetween consisting of a rear wall, a pair of side walls, and a front wall with a transparent window inset in said front wall, thereby defining an enclosed interior;

a laser source mounted perpendicular to said window;

a motor attached to said back wall of housing;

a means for providing movement from said motor to said laser source;

said laser source rigidly mounted to a bracket with said bracket rigidly attached to a mast;

said mast substantially vertical with first end pivotably connected to a support;

a first arm rigidly mounted and positioned perpendicular to said mast;

said first arm pivotably connected and positioned parallel to a second arm;

said second arm is rotatably connected to said motor.

17. A pet toy as set forth in claim 16 and further comprising:

a speed control means for regulating the speed of said motor.

18. A pet toy as set forth in claim 17 and further comprising:

a manual switch attached to exterior of said housing for adjusting said speed control means.

19. A pet toy as set forth in claim 16 and further comprising:

a hook shaped attachment member that is attached to exterior of said back wall.

* * * * *